United States Patent
Funk et al.

[19]

[11] Patent Number: 6,031,609
[45] Date of Patent: Feb. 29, 2000

[54] FOURIER TRANSFORM SPECTROMETER USING A MULTIELEMENT LIQUID CRYSTAL DISPLAY

[75] Inventors: David J. Funk; David S. Moore, both of Los Alamos, N.Mex.

[73] Assignee: The Regents of the University of California, Los Alamos, N.Mex.

[21] Appl. No.: 08/865,409

[22] Filed: May 29, 1997

[51] Int. Cl.[7] ........................................................ G01J 3/04
[52] U.S. Cl. ............................ 356/310; 356/308; 356/330
[58] Field of Search ........................................ 356/308, 310, 356/330

[56] References Cited

U.S. PATENT DOCUMENTS

| | | | |
|---|---|---|---|
| 4,193,691 | 3/1980 | Fjarlie | 356/330 |
| 5,090,807 | 2/1992 | Tai | 356/310 |
| 5,570,180 | 10/1996 | Nagai | 356/310 X |

OTHER PUBLICATIONS

Hammaker et al., "Hadamard Transform Raman Spectrometry," *Modern Techniques in Raman Spectroscopy*, Edited by J.J Laserna, John Wiley and Sons, Ltd. (1996), pp. 143–161, 216–225.

Radek Sobczynski et al., "Diode Arrays May Light Up Compact Spectrometers," Laser Focus World, Mar. 1995, pp. 75–81.

*Primary Examiner*—Robert H. Kim
*Attorney, Agent, or Firm*—Samuel M. Freund

[57] ABSTRACT

Fourier transform spectrometer using a multielement liquid crystal display. A ferroelectric liquid crystal mask is used as an optical encoder for a solid-state Fourier transform spectrometer. A 1×64 element array was striped and used as a 1×4 element device. The device intersected dispersed radiation and encoded each spectral component thereof with a carrier signal by applying half-wave potentials to each of the four striped (1×16) liquid crystal elements which varied the transmitted amplitude of the light from 0.03% to 28% of full scale. The light was spectrally recombined and imaged onto a photomultiplier and the resulting carrier frequencies (and their amplitudes) detected by Fourier transformation of the time-varying signal. Spectra of colored-glass filters were taken to demonstrate the spectrometer.

18 Claims, 4 Drawing Sheets

FOURIER TRANSFORM SPECTROMETER USING A MULTIELEMENT LIQUID CRYSTAL DISPLAY

FIELD OF THE INVENTION

The present invention relates generally to Fourier transform spectrometers and, more particularly, to the use of a ferroelectric liquid crystal mask as an optical encoder for a solid-state Fourier transform spectrometer. This invention was made with government support under Contract No. W-7405-ENG-36 awarded by the U.S. Department of Energy to The Regents of the University of California. The government has certain rights in the invention.

BACKGROUND OF THE INVENTION

Infrared (IR) and UV-VIS absorption have been used for decades for the sensitive detection of molecular species. However, routine detection of absorbances on the order of $10^{-5}$ has only recently been demonstrated, primarily in the area of infrared absorption, and that the detection of absorbances of less than $10^{-7}$ is possible. Present devices utilize laser diodes in both the near and mid-IR and have reached these detected absorbances through frequency modulation, which moves the detection bandwidth to higher frequencies, thereby reducing 1/f (flicker) noise and providing nearly quantum-limited detection. Unfortunately, these devices have limited tunability and lack the multiplex (Fellgett) advantage.

Fourier transform spectroscopy is generally performed using a Michelson interferometer, where the light from a broadband source is divided into equal-intensity beams, with one of the beams traversing a fixed-distance path, and the other traversing a variable-distance path. The beams are then recombined and focused onto a detector. Such systems have the Jacquinot (throughput) and Fellgett (multiplex) advantages. Fourier transform spectroscopy also obtains the Connes advantage; use of a HeNe laser for monitoring the motion of the mirrors (counting fringes) provides an internal calibration source, the stray light advantage; modulation of the individual frequency components eliminates stray light contributions, and finally, no emission contributions; location of the sample after beam recombination and before the detector provides contributions from emission that are DC (no modulation) and these are not observed in the transform plane.

Four major disadvantages of conventional FT spectrometers remain, however: (1) The need for large dynamic range amplifiers and large-bit A/D boards (16–20 bits). These requirements arise from the fact that at zero path difference, the signal is maximized and strong, whereas at large displacements of the movable mirror, the signal is minimal and extremely weak. (2) The use of a moving mirror which causes alignment problems if the instrument is jarred; the instrument is not easily deployed in the field. (3) The inability to directly ratio the sample and background signals simultaneously; a background must be run with the sample removed and then used over time. (4) Routine detectable absorbances are only between $10^{-3}$ and $10^{-4}$.

During the last decade, Hammaker et al. ("Hadamard Transform Raman Spectrometry" in *Modern Techniques in Raman Spectroscopy*, Edited by J. J Laserna, John Wiley and Sons, Ltd. (1996), pages 143–225) have demonstrated the application of Hadamard Transform (HT) spectroscopy as one method for obtaining increased S/N ratios for fixed integration times. More recently, Radek Sobczynski et al. in "Diode Arrays May Light Up Compact Spectrometers," *Laser Focus World*, March 1995, pages 75–81, have demonstrated a FT-near-IR instrument which encodes the spectral elements by varying the output of light-emitting diodes (LEDs) over time and observing the carrier amplitudes in the Fourier spectral domain, again providing significant gains in signal-to-noise ratio (S/N) over conventional scanning dispersive instruments. Individual wavelengths are modulated by modulating individual light emitting diodes, each at a different frequency, a plurality of diodes comprising the radiation source. The intensity of each spectral channel can be recovered with a standard Fourier transform of the detected time-domain signal.

Accordingly, it is an object of the present invention to provide an apparatus and method for performing Fourier transform spectroscopy using fixed dispersive optical elements and a polychromatic light source with no moving parts.

Another object of the invention is to provide a Fourier transform spectrometer having increased S/N ratios over scanning dispersive instruments and substantial freedom from 1/f noise.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the Fourier transform spectrometer hereof includes: a polychromatic light source; means for dispersing the light from the light source into spectral components; a first polarizer intercepting the spectrally dispersed light and providing a chosen angle of polarization thereto; a multiple-element polarizing device intercepting the spectrally dispersed and polarized light, each element thereof being responsive to an applied voltage which voltage determines the amount of polarization rotation of that element, for encoding each spectral component with a different time-varying dependence of polarization rotation for that spectral component; a second polarizer for intercepting the time-varying polarization rotation spectral components and generating therefrom a time-varying intensity for each spectral component; a time-varying voltage generator for each element of the multiple element polarization device; means for recombining the intensity modulated, dispersed light into a single light beam; a beam splitter for dividing the intensity modulated collimated light into a sample light beam and a reference light beam; means for introducing a sample into the sample light beam and for permitting light to exit the sample after passing therethrough; means for detecting the light exiting from the sample and the reference light beam; and means for performing a Fourier transform of the detected light exiting from the sample cell and the reference light beam, whereby a spectrum of the sample is obtained.

In another aspect of the present invention, in accordance with its objects and purposes, the method for spectroscopically analyzing a sample hereof includes: generating polychromatic light; dispersing the polychromatic light into spectral components; providing a chosen angle of polarization to the spectral light components; directing the polarized spectral light components into a multiple-element polarizing device, each element thereof encoding a spectral component with a different time-varying dependence of polarization rotation for that spectral component; generating a time-varying intensity modulation for each spectral component; recombining the intensity modulated, dispersed light into a single light beam; dividing the intensity modulated collimated light into a sample light beam and a reference light beam; permitting the sample light beam to pass through the sample; detecting the light exiting from the sample and light from the reference light beam; and performing a Fourier transform of the detected light exiting from the sample and the reference light beam, whereby a spectrum of the sample is obtained.

Benefits and advantages of the invention include increased S/N ratios over scanning dispersive instruments for fixed integration times through averaging and by substantial reduction in 1/f noise, providing what is equivalent to lock-in detection, without any moving parts.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION

Briefly, the present invention includes an apparatus and method for performing Fourier transform spectroscopy using liquid crystal technology, light from a broad-banded source being polarized and dispersed, with individual wavelengths being modulated at different frequencies by different elements of a liquid crystal mask. The Fourier transform spectrometer of the present invention includes (a) a multi-wavelength light source; (b) a subtractive double spectrometer which includes an apparatus for dispersing the light from the tungsten lamp, a multielement mask for intercepting the dispersed radiation and encoding each spectral component with a different frequency, and for recombining the modulated, dispersed radiation; (c) a beam splitter for dividing the output from the double spectrometer into a sample beam and a reference beam; (d) a sample cell; and (e) two photomultiplier tubes for observing the time-dependent output from the sample beam and the reference beam.

Figure 1:
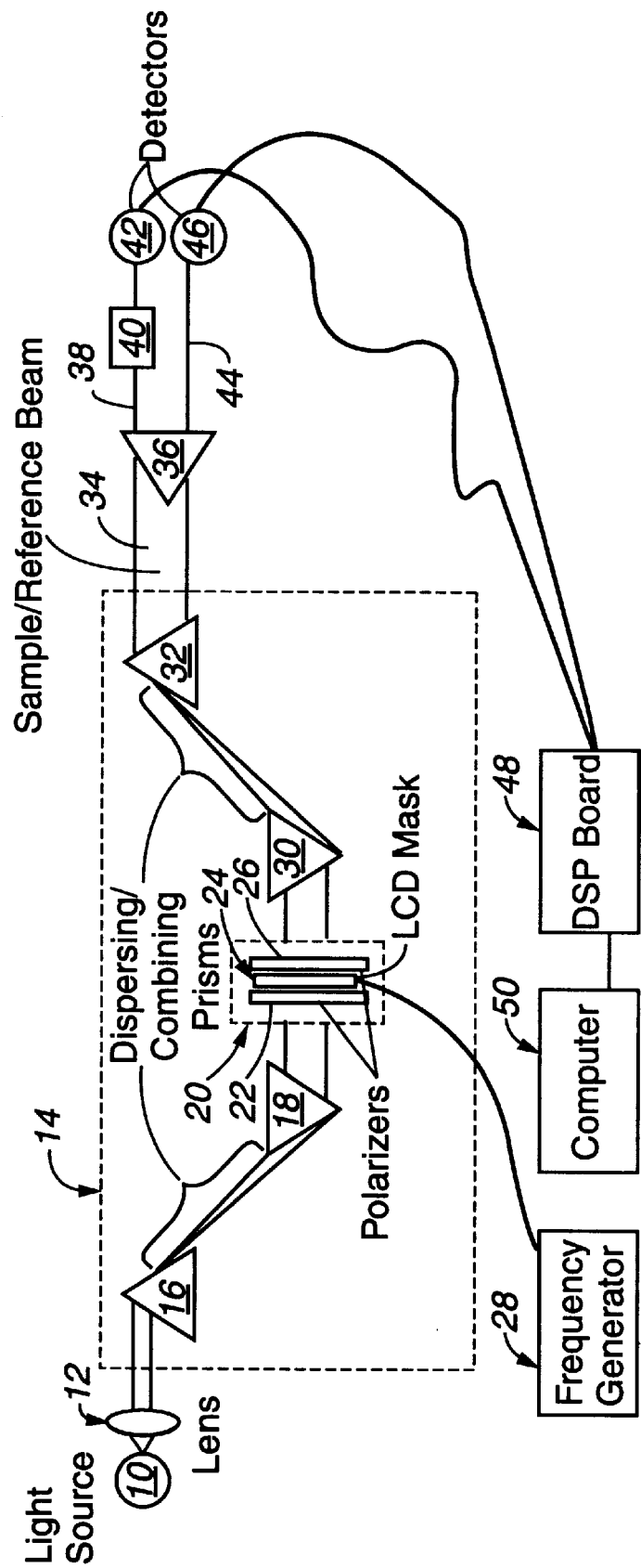
FIG. 1 is a schematic representation of the Fourier transform spectrometer of the present invention, showing (a) the tungsten lamp polychromatic light source; (b) the subtractive double spectrometer which includes an apparatus for dispersing the light from the tungsten lamp, a multielement mask for intercepting the dispersed radiation and encoding each spectral component with a different frequency, and for recombining the modulated, dispersed radiation; (c) the beam splitter for dividing the output from the double spectrometer into a sample beam and a reference beam; (d) the sample cell; and (e) two photomultiplier tubes for observing the time-dependent output from the sample beam and the reference beam.

Reference will now be made in detail to the present preferred embodiment of the present invention, an example of which is illustrated in the accompanying drawings. Turning now to the drawings, FIG. 1 is a schematic representation of one embodiment (one optical design) of the present Fourier transform spectrometer. Similar or identical structure or features will be identified by identical callouts. Polychromatic electromagnetic radiation from tungsten lamp, 10, is collimated by lens system, 12, and directed through a prism-based subtracting double spectrometer, 14. The first stage of the spectrometer includes a dispersing prism, 16, and a paralleling prism, 18. Although prisms are shown in FIG. 1, gratings can be used to accomplish the same purpose. The incidence angle of the light impinging on each prism is chosen to be at approximately the minimum deviation angle. The spectrally dispersed, collimated radiation is frequency encoded by passage through a ferroelectric liquid crystal (FLC) device, 20, which includes polarizer, 22, a commercially available 1×64 FLC device mask, 24, having a 35 $\mu$s switching time and crossed-polarizer, analyzer, 26. The mask consists of discrete rectangular elements, each 0.225 by 10.0 mm with a 0.025 mm gap between elements, each of which rotates the polarization of light ($\lambda$/2) from 0 to $\pi$/2 radians, depending on the applied voltage from frequency generator, 28. Transmitted light exiting the FLC is directed through the subtracting stage of the spectrometer in which a second set of prisms, 30 and 32, is arranged in a direction opposite to that for prisms 16 and 18 in order to restore the light to a collimated, white-light beam, 34. Although prisms are shown in FIG. 1, gratings can be used to accomplish the same purpose. It should be mentioned that it is believed by the inventors that the present spectrometer would also provide useful information without the use of paralleling prisms 18 and 32. However, all of the light must be imaged onto the respective detectors, to be described hereinbelow. Beam 34 is divided using wide-band dichroic beam splitter, 36. One-half of the beam, 38, is directed through sample, 40, and imaged onto a first 1P28A photomultiplier tube, 42; the second half of the beam, 44, provides a reference beam and is directed onto a second 1P28A photomultiplier tube, 46. In the event that the present invention is to be used for performing emission spectroscopy of a radiant sample, such as a flame, tungsten lamp 10 would be replaced by the radiating sample, and beamsplitter 36, sample 40, and detector 42 would be unnecessary.

As Sobczynski et al., supra, has undertaken with LED's, individual light components of the dispersed radiation of the present invention are frequency encoded by switching the elements of the mask from one polarization to the other in (ideally) a sinusoidal manner, with each element operating at a distinct frequency. This results in a time-dependent intensity impinging on each detector for each of the i elements.

The resulting signal generated on each detector can then be expressed as:

$$I(t) = \sum_{i=1}^{n} \frac{I_i}{2}(1 + \sin(\omega_i t)),$$

where $l(t)$ is the total time-dependent signal falling on the detector and $l_i$ and $\omega_i$ are the intensity at and frequency of the ith liquid crystal (LC) element. The resultant waveforms are then sampled and recorded using a commercially available digital signal processor (DSP), 48, and analyzed by computer, 50. In the present apparatus, a digital oscilloscope was employed for this purpose. The sampled and recorded waveforms are fast-Fourier transformed (FFT) on the computer, and the magnitude of the FFT is extracted, yielding the amplitude of the frequency component, $\omega_i$, which is equal to the intensity of light falling on the detector from the ith LC element.

Figure 2:
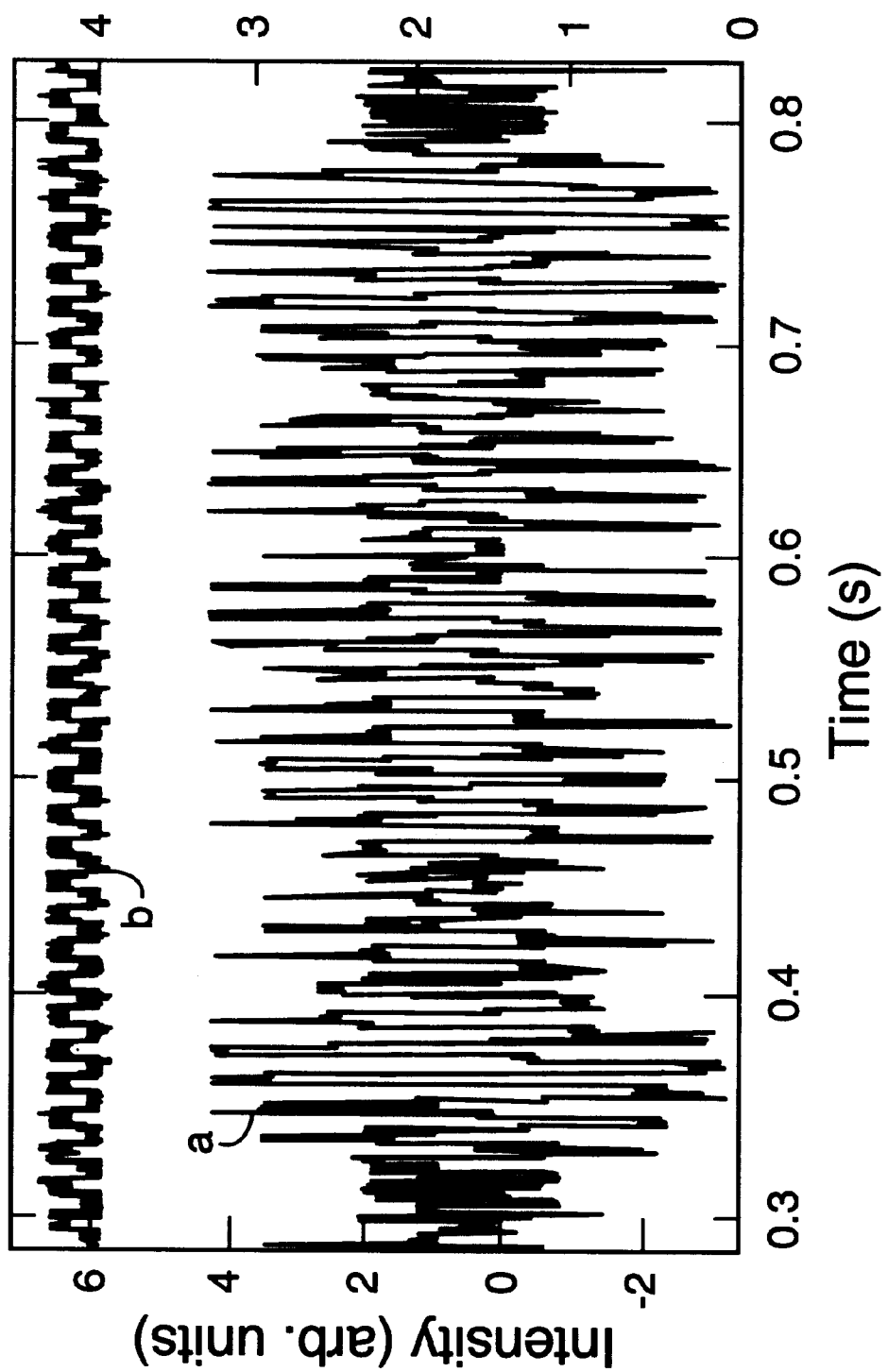
FIG. 2 shows the unprocessed output of the photomultiplier tubes illustrated in FIG. 1 hereof as a function of time, the lower trace (a) demonstrating the time-dependent signal of the full output from the multielement mask where carrier frequencies exhibit an interference pattern, while the upper trace (b) demonstrates the time-dependent signal transmitted through a red filter, where only one of the elements in the mask is transmitting light and only a single frequency is detected.

FIG. 2 shows two unprocessed, time-dependent traces from the photomultiplier tubes illustrated in FIG. 1 hereof, observed with the LC mask striped into a 1×4 array, the lower trace (a) demonstrating the time-dependent reference signal of the full output from the multielement mask, while the upper trace (b) demonstrates the time-dependent signal transmitted through the sample which is a Corning 2-64 color filter that transmits only the red portion of the electromagnetic spectrum, such that only one of the elements in the mask transmits light and, as a result, only a single frequency is detected. As seen in FIG. 2, the fully modulated (reference) spectrum shows complex beating of the four frequencies applied to the elements of the mask with one another, while the solely red light spectrum (sample) shows the characteristic frequency at which the red portion of the spectrum (mask element) is modulated. Additionally, the sample trace illustrates that square wave modulation was employed. It is preferred that analog driving potentials coupled to phase-locked loops to stabilize the driving frequencies be used. This will result in substantially pure sine waves which will keep the majority of the energy at the fundamental driving frequency reduce the amount in harmonics composing a square-wave signal.

Figure 3A:
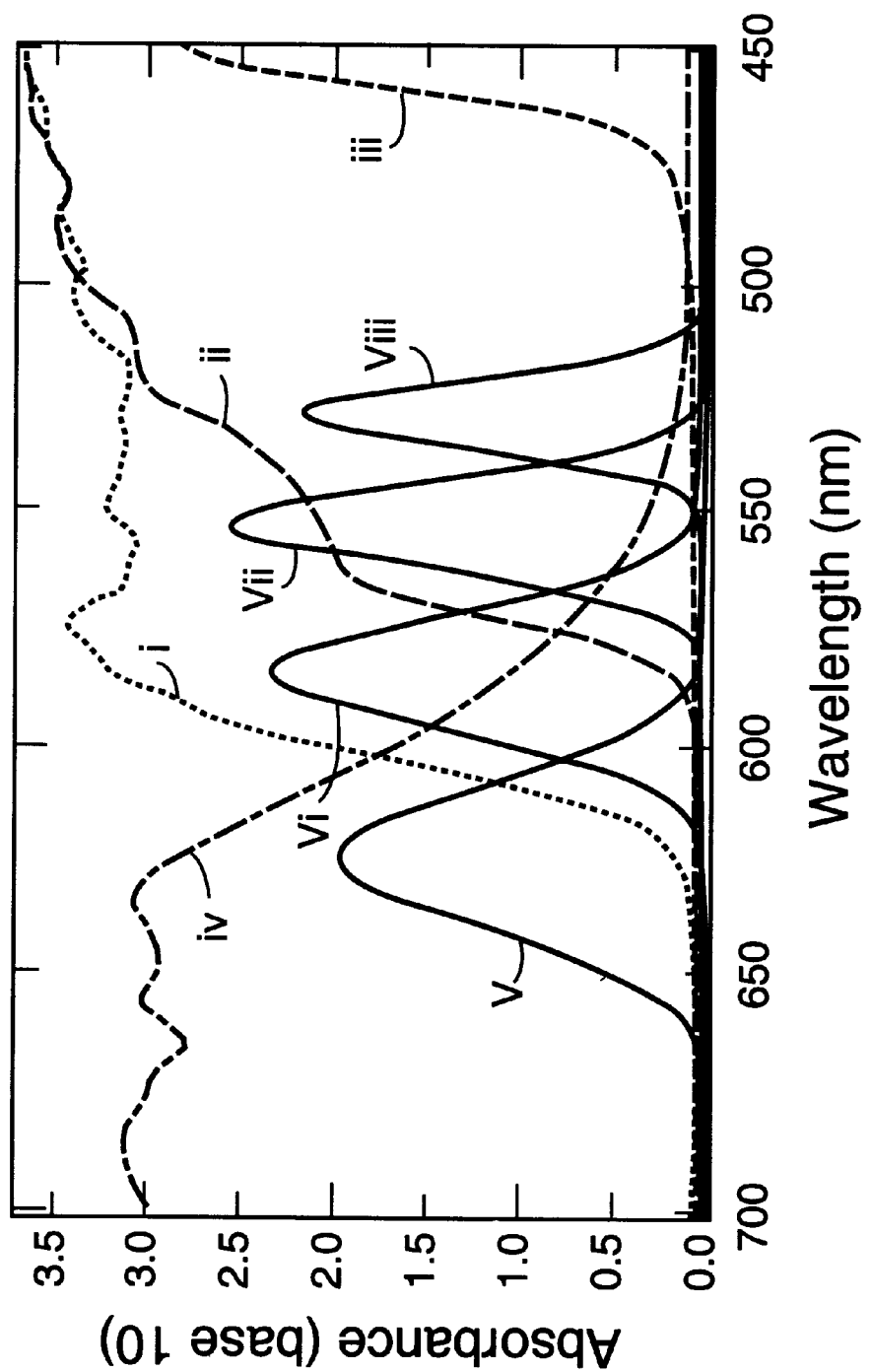
FIG. 3a presents spectra as a function of wavelength obtained from a commercially available spectrometer for filters employed to demonstrate the present apparatus: red (i); orange (ii) yellow (iii); and blue (iv), the solid lines illustrating Gaussian fits to the spectral windows of each of four pixels in the mask used (v–viii).
Figure 3B:
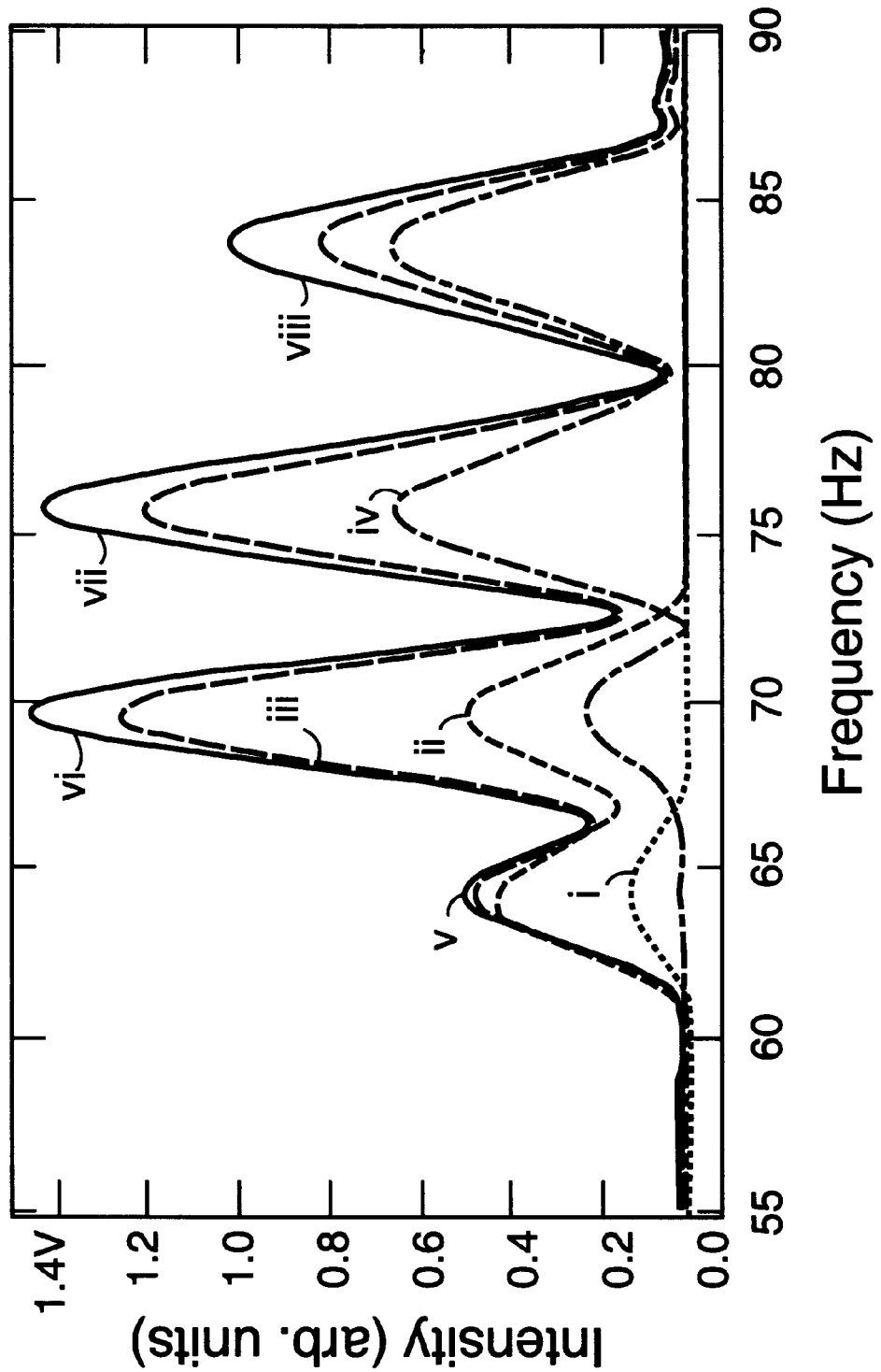
FIG. 3b presents the Fourier transformed spectra for the same filters employed in FIG. 3a, obtained from the apparatus described in FIG. 1 hereof, the relative intensities of the frequency peaks following what would be expected from the overlap of the filters and the Gaussian transmission functions of the present spectrometer.

FIG. 3a presents spectra as a function of wavelength for filters employed to demonstrate the apparatus described in FIG. 1 hereof: red (i); orange (ii) yellow (iii); and blue (iv), the solid lines illustrating Gaussian fits to the spectral windows of each of the four 1×16 element segments (pixels) of mask used (v–viii). The filter spectra were taken using a commercially available standard diode array, ultraviolet-visible spectrometer. It should be mentioned that the spectrometer transmission is not exactly Gaussian; however, the fits are used for illustrative purposes. FIG. 3b presents the Fourier transformed spectra for the same filters obtained using the spectrometer of the present invention, the relative intensities (amplitudes) of the frequency peaks exhibit the expected behavior from the spectral overlap of the filters used and the Gaussian transmission functions. For example, it may be observed that for the red transmission filter (i), the intensities of all other spectral (mask) elements except that containing the red spectrum are zero. By integrating the areas under each peak in the frequency domain, and taking the ratio of these areas (sample/reference) quantitative absorption for each band can be obtained.

Because the apparatus of the present invention (as is the Sobczynski et al., supra, invention) is solid state, it can be easily deployed in the field. It has no moving parts, making it useful for unattended monitoring or airborne deployment.

By contrast to Sobczynski et al., however, the present invention requires only a white light source as opposed to independent diodes; this increases the flexibility of the instrument by allowing for as many resolution elements and/or colors as required (limited only by the mask and/or by the dispersive elements in the optical system). Furthermore, the invention retains the Fellget advantage by sampling an entire portion of the spectrum, the size of the portion being determined by the number of mask elements and the resolution required. Though the present spectrometer does not retain a true Connes advantage, as does the stationary mask HT apparatus of Hammaker et al., supra, because there are no moving parts, the present spectrometer provides good co-addition and good subtraction which is analogous to the Connes advantage. Moreover, background and sample spectra can be acquired simultaneously, a definite advantage over Michelson FT spectrometers and multiplexed dispersive systems. This eliminates the time dependence of the background that could affect measured absorbances. Stray light and emission contributions are eliminated through intensity modulation and detection of the amplitude of the carrier bands. It is expected that similar increases in S/N ratios to multiplexed dispersive spectrometers will be realized when compared to dual arm spectrometers (for fixed data collection time), and perhaps an order of magnitude increase over multiplexed dispersive instruments will occur by shifting the detection bandwidth of the present spectrometer away from 1/f noise (high kHz to perhaps MHz switching frequencies). As stated hereinabove, the present spectrometer provides the equivalent to lock-in detection for each band. Qualitatively, the FT seeks the characteristic frequencies encoded in the spectrum in a similar manner as the lock-in picks out the carrier frequency through use of the reference frequency.

The present instrument will be useful for time-domain spectroscopy. For example, if switching rates are increased by a factor of a hundred and the spectral window is limited to 100 elements (single-species time evolution or coarse spectra), with 512 data points per waveform, spectra could be obtained at rates greater than 5 kHz, which would be useful for monitoring chemical kinetics of solutions, high-pressure combustion processes (explosive deflagration chemistry) where resolution is less of a problem, and gas-phase kinetics.

The foregoing description of the invention has been presented for purposes of illustration and description and is not intended to be exhaustive or to limit the invention to the precise form disclosed, and obviously many modifications and variations are possible in light of the above teaching. For example, although prisms are deployed in the present spectrometer, it is clear that other dispersive elements, such as reflection gratings, could be used. Moreover, the spectrometer might employ multiple dispersive elements to permit expansion of a limited wavelength range over the LC mask surface, thereby increasing the resolution in the chosen wavelength range to, for instance, 0.01 $cm^{-1}$ in the IR and 0.02 nm in the visible spectrum.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A Fourier transform spectrometer, which comprises in combination:

(a) a polychromatic light source;

(b) means for dispersing the light from the light source into spectral components;

(c) a first polarizer intercepting the spectrally dispersed light and providing a chosen angle of polarization thereto;

(d) a multiple-element polarizing device intercepting the spectrally dispersed and polarized light, each element thereof being responsive to an applied voltage which voltage determines the amount of polarization rotation of that element, for encoding each spectral component with a different time-varying dependence of polarization rotation for that spectral component;

(e) a second polarizer for intercepting the time-varying polarization rotation spectral components and generating therefrom a time-varying intensity for each spectral component;

(f) a time-varying voltage generator for each element of said multiple element polarization device;

(g) means for recombining the intensity modulated, dispersed light into a single light beam;

(h) a beam splitter for dividing the intensity modulated collimated light into a sample light beam and a reference light beam;

(i) means for introducing a sample into the sample light beam and for permitting light to exit the sample after passing therethrough;

(j) means for detecting the light exiting from the sample and the reference light beam; and (k) means for performing a Fourier transform of the detected light exiting from the sample cell and the reference light beam, whereby a spectrum of the sample is obtained.

2. The Fourier transform spectrometer as described in claim 1, wherein said means for dispersing the light from the light source into spectral components, and said means for recombining the intensity modulated, dispersed light into a single light beam include prisms.

3. The Fourier transform spectrometer as described in claim 1, wherein said means for dispersing the light from the light source into spectral components, and said means for recombining the intensity modulated, dispersed light into a single light beam include diffraction gratings.

4. The Fourier transform spectrometer as described in claim 1, further comprising means for collimating the spectrally dispersed light from the light source before the light enters said first polarizer, and means for collimating the light exiting said intensity modulated, dispersed light recombining means.

5. The Fourier transform spectrometer as described in claim 4, wherein said means for collimating the spectrally dispersed light from the light source before the light enters said first polarizer, and said means for collimating the light exiting said intensity modulated, dispersed light recombining means include prisms.

6. The Fourier transform spectrometer as described in claim 4, wherein said means for collimating the spectrally dispersed light from the light source before the light enters said first polarizer, and said means for collimating the light exiting said intensity modulated, dispersed light recombining means include diffraction gratings.

7. The Fourier transform spectrometer as described in claim 1, wherein said multiple-element polarizing device includes a ferroelectric liquid crystal mask.

8. The Fourier transform spectrometer as described in claim 1, wherein said polychromatic light source includes a tungsten lamp.

9. The Fourier transform spectrometer as described in claim 1, wherein said time-varying voltage generator for each element of said multiple element polarization device provides sinusoidal time-varying voltage.

10. A method for spectroscopically analyzing a sample, which comprises the steps of:

a. generating polychromatic light;

b. dispersing the polychromatic light into spectral components;

c. providing a chosen angle of polarization to the spectral light components;

d. directing the polarized spectral light components into a multiple-element polarizing device, each element thereof encoding a spectral component with a different time-varying dependence of polarization rotation for that spectral component;

e. generating a time-varying intensity modulation for each spectral component;

f. recombining the intensity modulated, dispersed light into a single light beam;

g. dividing the intensity modulated collimated light into a sample light beam and a reference light beam;

h. permitting the sample light beam to pass through the sample;

i. detecting the light exiting from the sample and light from the reference light beam; and j. performing a Fourier transform of the detected light exiting from the sample and the reference light beam, whereby a spectrum of the sample is obtained.

11. A Fourier transform spectrometer for measuring emission from a radiant sample, which comprises in combination:

a. means for dispersing the light from the radiant sample source into spectral components;

b. a first polarizer intercepting the spectrally dispersed light and providing a chosen angle of polarization thereto;

c. a multiple-element polarizing device intercepting the spectrally dispersed and polarized light, each element thereof being responsive to an applied voltage which voltage determines the amount of polarization rotation of that element, for encoding each spectral component with a different time-varying dependence of polarization rotation for that spectral component;

d. a second polarizer for intercepting the time-varying polarization rotation spectral components and generating therefrom a time-varying intensity for each spectral component;

e. a time-varying voltage generator for each element of said multiple element polarization device;

f. means for recombining the intensity modulated, dispersed light into a single light beam;

g. means for detecting the light in the single light beam; and h. means for performing a Fourier transform of the detected light, whereby a spectrum of the radiant sample is obtained.

12. The Fourier transform spectrometer as described in claim 11, wherein said means for dispersing the light from the light source into spectral components, and said means for recombining the intensity modulated, dispersed light into a single light beam include prisms.

13. The Fourier transform spectrometer as described in claim 11, wherein said means for dispersing the light from the light source into spectral components, and said means for recombining the intensity modulated, dispersed light into a single light beam include diffraction gratings.

14. The Fourier transform spectrometer as described in claim 11, further comprising means for collimating the spectrally dispersed light from the light source before the light enters said first polarizer, and means for collimating the light exiting said intensity modulated, dispersed light recombining means.

15. The Fourier transform spectrometer as described in claim 14, wherein said means for collimating the spectrally dispersed light from the light source before the light enters said first polarizer, and said means for collimating the light exiting said intensity modulated, dispersed light recombining means include prisms.

16. The Fourier transform spectrometer as described in claim 14, wherein said means for collimating the spectrally dispersed light from the light source before the light enters said first polarizer, and said means for collimating the light exiting said intensity modulated, dispersed light recombining means include diffraction gratings.

17. The Fourier transform spectrometer as described in claim 11, wherein said multiple-element polarizing device includes a ferroelectric liquid crystal mask.

18. The Fourier transform spectrometer as described in claim 11, wherein said time-varying voltage generator for each element of said multiple element polarization device provides sinusoidal time-varying voltage.

* * * * *